Patented Oct. 10, 1922.

1,431,655

UNITED STATES PATENT OFFICE.

WILHELM HERZBERG, OF BERLIN-WILMERSDORF, AND OSWALD SCHARFENBERG, OF BERLIN-SCHONEBERG, GERMANY, ASSIGNORS TO ACTIEN GESELLSCHAFT FUR ANILIN FABRIKATION, OF BERLIN, GERMANY.

ORTHOOXYAZO DYE.

No Drawing.    Application filed August 30, 1921.   Serial No. 496,970.

*To all whom it may concern:*

Be it known that we, WILHELM HERZBERG and OSWALD SCHARFENBERG, citizens of the German Republic, residing at Berlin-Wilmersdorf, Germany, and Berlin-Schoneberg, Germany, our P. O. address being Prinzregentenstr. 10, Berlin-Wilmersdorf, Germany, and Rosenheimerstr. 12, Berlin-Schoneberg, Germany, have invented certain new and useful Improvements in Ortho-oxyazo Dyes (for which we have filed applications in Germany August 28, 1917; Germany, January 18, 1918; Germany, April 22, 1918; England, June 8, 1920; France, June 19, 1920; Italy, June 7, 1920; Switzerland, July 8, 1920; Czecho-Slovakia, June 17, 1920), of which the following is a specification.

By our invention by combining a diazotised 2-aminophenol derivative which contains negative radicals such as halogen with 8-halogen-1-oxynaphthalene-5-sulfonic acid new valuable dyestuffs for wool are produced their chromium lakes having a very good fastness. They form in the dry pulverised shape dark powders soluble in water to blue solutions being insoluble in alcohol, ether, benzene, yielding upon reduction 8-chloro-2-amino-1-oxynaphthalene-5-sulfonic acid and a 2-aminophenol derivative, dyeing on wool with chromium mordants blue tints of a very good fastness.

The 2-aminophenol derivatives containing a negative radicle such as halogen which may be employed are represented by the general formula

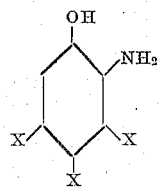

in which X stands for univalent substituents such as hydrogen, alkyl or halogen and at least one of these substituents is a negative group such as halogen.

The following example illustrates our invention, the parts being by weight:

21 parts of 2-amino-3.4.5-trichlorophenol are diazotised in the usual manner. The diazo compound is allowed to run into a solution of 25.9 parts of 8-chloro-1-oxynaphthalene-5-sulfonic acid, alkaline with sodium carbonate. The dyestuff is separated and worked up as usual. It dyes wool with chromium mordants clear blue tints.

It is obvious to those skilled in the art that our invention is not limited to the foregoing example or to the details given therein. Similar dyes may be obtained by substituting for the parent material in the foregoing example other compounds within the foregoing definition.

What we claim is,—

1. The herein described new ortho-oxy-azo dyes being in the shape of alkali metal salts dark powders soluble in water to blue solutions from which an inorganic or organic acid separates a brownish orange precipitation, the aqueous solution becoming violet by addition of sodium carbonate, red by addition of sodium hydroxide, yielding upon reduction 8-chloro-2-amino-1-oxynaphthalene-5-sulfonic acid and 2-amino-3.4.5-trihalogenated 1-oxybenzene, dyeing on wool with chromium mordants blue tints of a very good fastness and corresponding as free acids to the general formula:

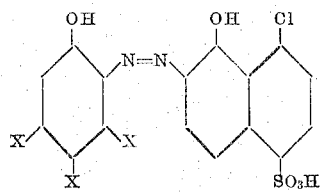

X meaning halogen.

2. The herein described new ortho-oxy-azo dye being in the shape of alkali metal salt a dark powder soluble in water to a blue solution from which an inorganic or organic acid separates a brownish orange precipitation, the aqueous solution becoming violet by addition of sodium carbonate, red by addition of sodium hydroxide, yielding upon reduction 8-chloro-2-amino-1-oxynaphthalene-5-sulfonic acid and 2-amino-3.4.5-trichloro-1-oxybenzene, dyeing on wool with chromium mordants clear blue tints of a very good fastness and corresponding as free acid to the general formula:
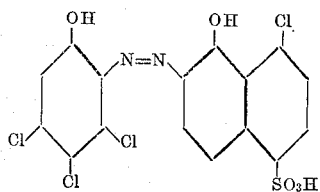
In testimony whereof we affix our signatures in presence of two witnesses.
WILHELM HERZBERG.
OSWALD SCHARFENBERG.
Witnesses:
  Dr. GERHARD HOPPE,
  Dr. RUDOLF HAUGWITZ.